United States Patent
Kawachi et al.

(10) Patent No.: US 9,874,672 B2
(45) Date of Patent: Jan. 23, 2018

(54) ILLUMINATION DEVICE

(71) Applicant: PANASONIC INTELLECTUAL PROPERTY MANAGEMENT CO., LTD., Osaka (JP)

(72) Inventors: Hideharu Kawachi, Hyogo (JP); Shinichi Anami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 15/181,839

(22) Filed: Jun. 14, 2016

(65) Prior Publication Data

US 2016/0377787 A1    Dec. 29, 2016

(30) Foreign Application Priority Data

Jun. 26, 2015  (JP) .................................. 2015-128301

(51) Int. Cl.
*F21V 8/00*     (2006.01)
*F21S 8/04*     (2006.01)
(Continued)

(52) U.S. Cl.
CPC .............. *G02B 6/0006* (2013.01); *F21S 8/04* (2013.01); *G02B 6/0008* (2013.01); *G02B 6/241* (2013.01); *G02B 6/3624* (2013.01)

(58) Field of Classification Search
CPC .... G02B 6/0006; G02B 6/0008; G02B 6/241; G02B 6/3624; F21S 8/04; F21V 21/00; F21V 21/005; F21V 21/14; F21V 21/34; F21V 21/35; F21V 2200/10; F21V 14/02; F21Y 2115/30
See application file for complete search history.

(56) References Cited

U.S. PATENT DOCUMENTS 5,347,431 A * 9/1994 Blackwell .............. A61B 90/35
                                                       362/11
2011/0085319 A1   4/2011 Hikmet
(Continued)

FOREIGN PATENT DOCUMENTS

JP   H06-130526 A   5/1994
JP   2001-184934 A   7/2001
(Continued)

OTHER PUBLICATIONS

U.S. Appl. No. 15/180,302 to Hideharu Kawachi et al., filed Jun. 13, 2016.

*Primary Examiner* — Bao Q Truong
(74) *Attorney, Agent, or Firm* — Greenblum & Bernstein, P.L.C.

(57) ABSTRACT

An illumination device includes a light source, a transmission part and a lighting appliance. The light source is configured to emit a laser light. The transmission part is configured to transmit the laser light emitted from the light source through an optical fiber. The lighting appliance is configured to convert a wavelength of the laser light transmitted through the transmission part and emit an illumination light. The transmission part includes a guide part having a rail-shape and extending along a transmission direction of the laser light. The lighting appliance is further configured to be mounted in an arbitrary position of the guide part.

13 Claims, 6 Drawing Sheets

(51) Int. Cl.
 *G02B 6/36* (2006.01)
 *G02B 6/24* (2006.01)

(56) References Cited

U.S. PATENT DOCUMENTS

| | | |
|---|---|---|
| 2011/0148280 A1 | 6/2011 | Kishimoto et al. |
| 2011/0279039 A1* | 11/2011 | Kishimoto ......... H05B 33/0803 315/113 |
| 2014/0111094 A1 | 4/2014 | Kodama et al. |
| 2015/0103554 A1* | 4/2015 | Tamura ................. H01S 5/005 362/553 |
| 2015/0184841 A1* | 7/2015 | Liu ........................ F21V 21/34 362/270 |

FOREIGN PATENT DOCUMENTS

| | | |
|---|---|---|
| JP | 2004-113175 A | 4/2004 |
| JP | 2011-129374 A | 6/2011 |
| JP | 2011-526060 A | 9/2011 |
| JP | 2013-080638 A | 5/2013 |
| JP | 2014-175126 A | 9/2014 |

* cited by examiner

FIG.6B

ILLUMINATION DEVICE

CROSS-REFERENCE TO RELATED APPLICATIONS

This application claims priority to Japanese Patent Application No. 2015-128301 filed on Jun. 26, 2015, the entire contents of which are incorporated herein by reference.

TECHNICAL FIELD

The present disclosure relates to an illumination device which uses a light source for emitting laser light.

BACKGROUND

Conventionally, a spotlight type illumination device is used in a show window or a museum to illuminate an object. In this illumination device, an LED or the like capable of emitting light at high efficiency has been extensively used. Recently, there is known an illumination device which uses, as a light source, a semiconductor laser capable of emitting light at higher efficiency and higher output power than the LED (see, e.g., Unexamined Patent Application Publication No. 2014-175126A).

The illumination device disclosed in JP2014-175126A includes a light source configured to emit laser light and a plurality of light emitting units. Each of the light emitting units includes a linear light guide body having an incidence surface on which the laser light emitted from the light source is incident and an emission surface from which the incident laser light is emitted. The light source and each of the light emitting units are connected by an optical fiber. The laser light emitted from the light source is transmitted to each of the light emitting units through the optical fiber. Furthermore, the respective light emitting units are configured such that they can be disposed in a linear shape, a curve line shape or a bend line shape on a unit-by-unit basis.

Meanwhile, there is a spotlight type illumination device in which the installation position of a lighting appliance can be arbitrarily selected depending on the arrangement of an object to be irradiated with illumination light. However, in the illumination device disclosed in JP2014-175126A, the position of each of the light emitting units (lighting appliances) is fixed with respect to the light source for emitting laser light. It is therefore impossible to arbitrarily select the installation positions of the light emitting units depending on the use environment of the illumination device.

SUMMARY OF THE INVENTION

In view of the above, the present disclosure provides an illumination device capable of arbitrarily selecting the installation position of a lighting appliance which emits illumination light using laser light as a light source.

In accordance with an aspect of the present disclosure, there is provided an illumination device including a light source, a transmission part and a lighting appliance. The light source is configured to emit a laser light. The transmission part is configured to transmit the laser light emitted from the light source through an optical fiber. The lighting appliance is configured to convert a wavelength of the laser light transmitted through the transmission part and emit an illumination light. The transmission part includes a guide part having a rail-shape and extending along a transmission direction of the laser light. The lighting appliance is further configured to be mounted in an arbitrary position of the guide part.

According to the present disclosure, the lighting appliance can be mounted in an arbitrary position of the guide part having a rail-shape and extending along a transmission direction of laser light. This enables a user or other person to arbitrarily select the installation position of the lighting appliance which emits illumination light.

DETAILED DESCRIPTION OF EMBODIMENTS

Figure 1A:
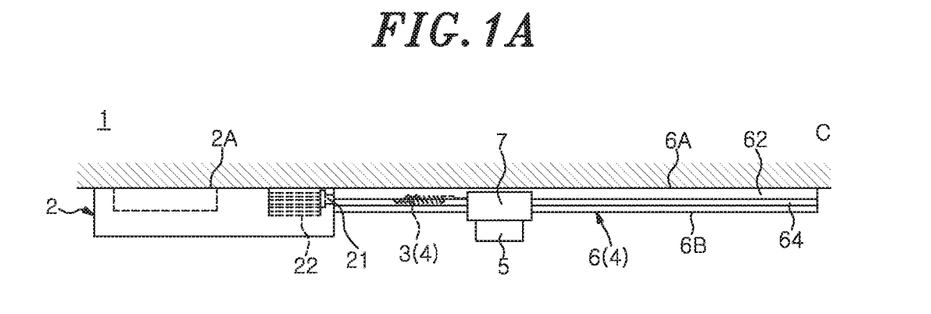
FIG. 1A is a side view showing a configuration of an illumination device according to one embodiment.
Figure 1B:
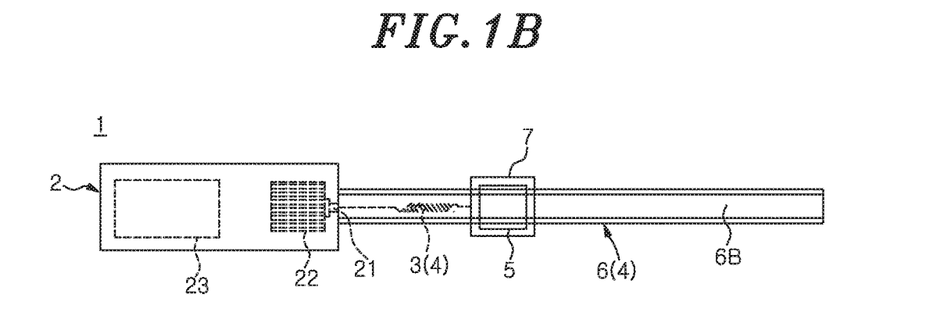
FIG. 1B is a front view thereof.
Figure 1C:
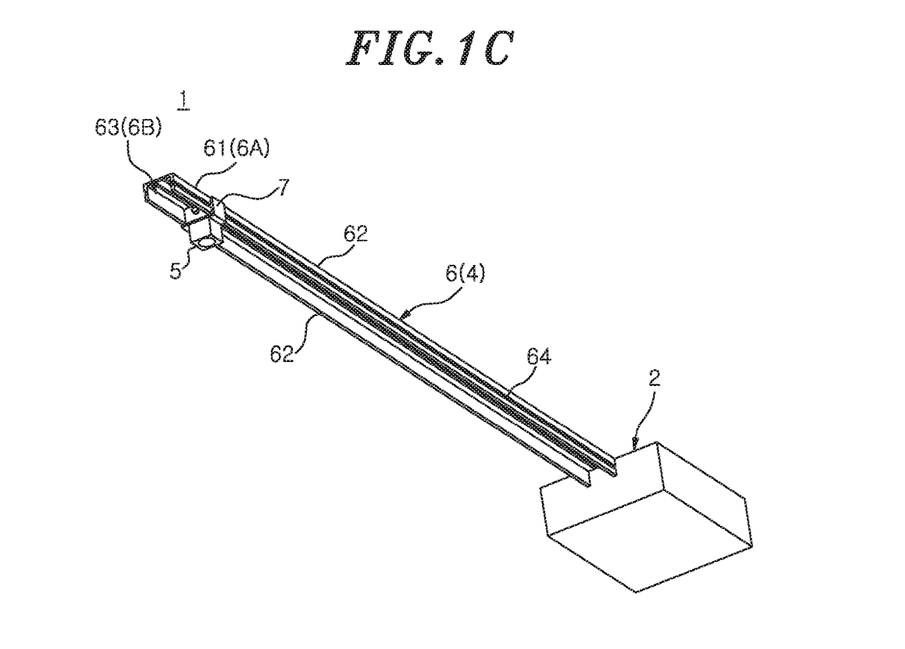
FIG. 1C is a perspective view thereof.

An illumination device according to one embodiment will be described with reference to FIGS. 1A to 5. As illustrated in FIGS. 1A to 1C, the illumination device 1 of the present embodiment is installed on an installation surface C of a ceiling or the like and is configured to irradiate illumination light primarily in a direction perpendicular to the installation surface C. The illumination device 1 includes a light source 2 configured to emit laser light, a transmission part 4 configured to transmit the laser light emitted from the light source 2 through an optical fiber 3, and a lighting appliance 5 configured to convert a wavelength of the laser light transmitted through the transmission part 4 and to irradiate illumination light.

The transmission part 4 includes a guide part 6 having a rail-shape and extending in a transmission direction of laser light. The surfaces of the light source 2 and the guide part 6 fixed to the installation surface C serve as installation surfaces 2A and 6A, respectively. Furthermore, the opposite surface of the guide part 6 from the installation surface 6A serves as a mounting surface 6B on which the lighting appliance 5 is mounted. The lighting appliance 5 can be mounted in an arbitrary position of the guide part 6 by a mounting fixture 7.

The light source 2 includes a semiconductor laser element 21, a heat dissipation part 22 for dissipating heat generated during the operation of the semiconductor laser element 21, a lighting control circuit 23 for lighting the semiconductor laser element 21, and a light source case 24 for accommodating the semiconductor laser element 21, the heat dissipation part 22 and the lighting control circuit 23. In the subject specification, the lighting control circuit is described as one component of the light source 2, which is accommodated within the light source case 24. As an alternative example, the lighting control circuit 23 may be an independent component provided outside the light source case 24.

A laser element configured to emit blue light having a wavelength of, for example, 440 nm to 455 nm, is used as the semiconductor laser element 21. The heat dissipation part 22 is made of a metal having high heat dissipation, such as an aluminum alloy or the like. A general-purpose die-cast member provided with fins for improving heat dissipation is used as the heat dissipation part 22. The lighting control circuit 23 includes a rectifier transformer circuit (not shown) which converts an electric current received from a commercial power source (not shown) to a predetermined direct current and controls a voltage applied to control the output of the semiconductor laser element 21 to correspond to a predetermined output control signal. The light source case 24 is a box-shaped structure made of, for example, stainless steel or the like. The guide part 6 is connected to one surface of the light source case 24.

The optical fiber 3 includes a core made of a light-transmitting material having a high refractive index, a clad made of a material having a low refractive index, and a covering layer configured to cover the core and the clad. The core, the clad and the covering layer are made of a material having predetermined flexibility. The optical fiber 3 is formed in a curl cord shape so as to have a spiral portion in a partial region of the total length (see FIG. 2 which will be described later). The optical fiber 3 is connected at one end to the light source 2 and at the other end to the lighting appliance 5 via the mounting fixture 7. Since the optical fiber 3 having a curl cord shape is extendible and retractable, it is possible to arbitrarily adjust the distance between the light source 2 and the lighting appliance 5 which are connected to the optical fiber 3.

Figure 2:
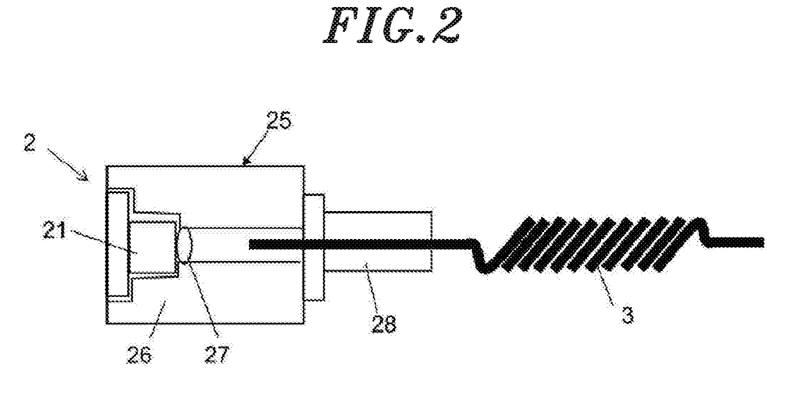
FIG. 2 is an enlarged view illustrating a connection portion of a light source and an optical fiber used in the illumination device.

As illustrated in FIG. 2, the light source 2 includes a connection unit 25 which interconnects the semiconductor laser element 21 and the optical fiber 3. The connection unit 25 includes a lens 26 which condenses the laser light emitted from the semiconductor laser element 21, a holder 27 which holds the semiconductor laser element 21 in the light source case 24 and into which an incidence end portion of the optical fiber 3 is inserted, and a fixture 28 which fixes the optical fiber 3 to the holder 27.

The guide part 6 (see FIG. 1C described above and FIG. 5 to be described later) is a rail-shaped structural member extending in an elongated shape. The guide part 6 includes a flat bottom wall 61 extending in the longitudinal direction of the guide part 6 to define an installation surface 6A, opposite lateral walls 62 formed at the opposite edges of the bottom wall 61, and an opening 63, defined by a mounting surface 6B, into which the lighting appliance 5 is inserted. Engagement grooves 64, to which the mounting fixture 7 is locked, are formed on the outer surfaces of the lateral walls 62 over the total length of the guide part 6. Furthermore, a pair of electrodes 65 is formed on the surface of the bottom wall 61 facing toward the mounting surface 6B over the total length of the guide part 6. The electrodes 56 are connected to the lighting control circuit 23 of the light source 2, which is not illustrated.

Figure 3:
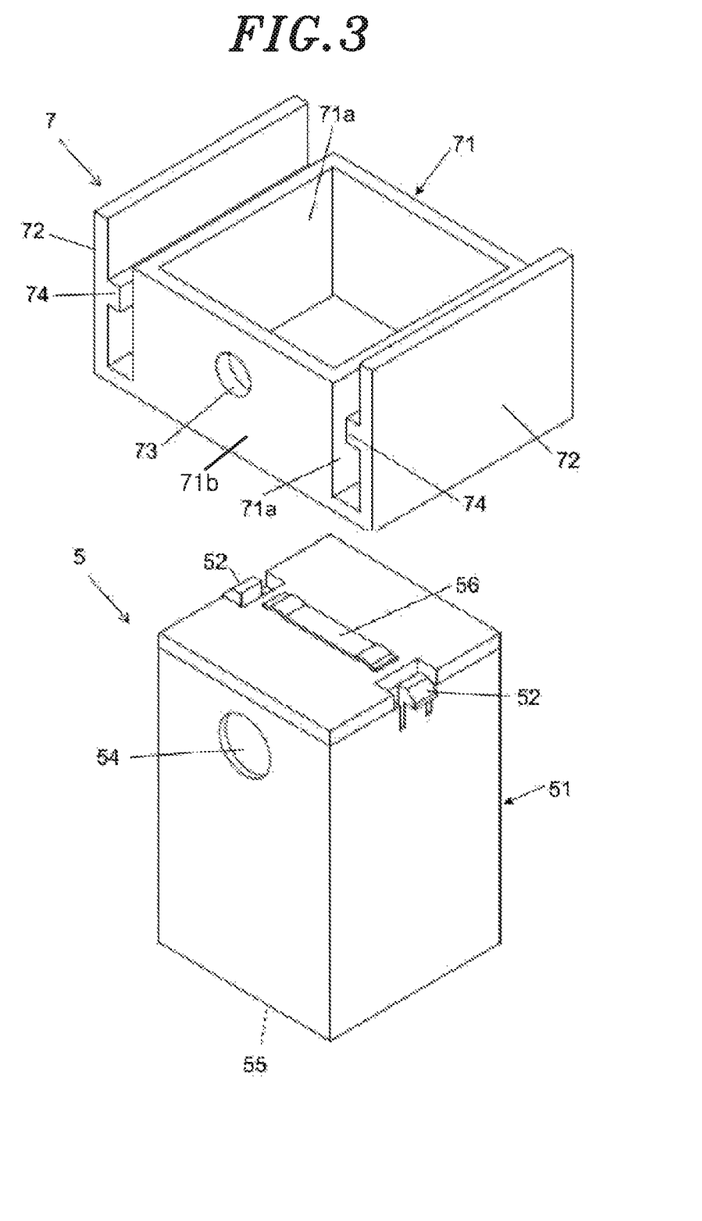
FIG. 3 is a perspective view of a lighting appliance used in the illumination device.

As illustrated in FIG. 3, the mounting fixture 7 includes a frame 71 configured to hold the lighting appliance 5 and engagement pieces 72 extending in an L-like shape from the lower edges of opposite side surfaces 71a of the frame 71. The frame 71 is formed in a square tube shape with the upper and lower sides thereof opened. A connection hole 73 for connecting the optical fiber 3 is formed on a front surface 71b of the frame 71. The engagement pieces 72 are formed to leave predetermined gaps between the engagement pieces 72 and the side surfaces 71a of the frame 71. Projection portions 74 engaging with the engagement grooves 64 of the guide part 6 are provided on the surfaces of the engagement pieces 72 facing toward the side surfaces 71a of the frame 71 (see FIGS. 4A and 4B which will be described later).

The lighting appliance 5 includes a lighting appliance case 51 and engaging claws 52 which engage with the frame 71 of the mounting fixture 7. The lighting appliance case 51 is a square-tube-shaped structural member which accommodates a wavelength conversion part 53 to be described later. The lighting appliance case 51 includes a hole 54 formed on the front surface thereof so as to introduce the laser light transmitted through the optical fiber 3 and an opening portion 55 formed on the bottom surface thereof so as to emit light. The engaging claws 52 are respectively provided at the upper edges of the opposite side surfaces of the lighting appliance case 51 and are biased to urge the claw tips toward the lateral sides. When the lighting appliance 5 is fitted to the mounting fixture 7, the engaging claws 52 engage with the upper edges of the frame 71. Furthermore, the lighting appliance 5 includes a leaf spring 56 provided on the top surface of the lighting appliance case 51 and configured to short-circuit the electrodes 65 of the guide part 6 when the lighting appliance 5 is mounted to the guide part 6. The leaf spring 56 is formed of an electrically conductive member.

Figure 4A:
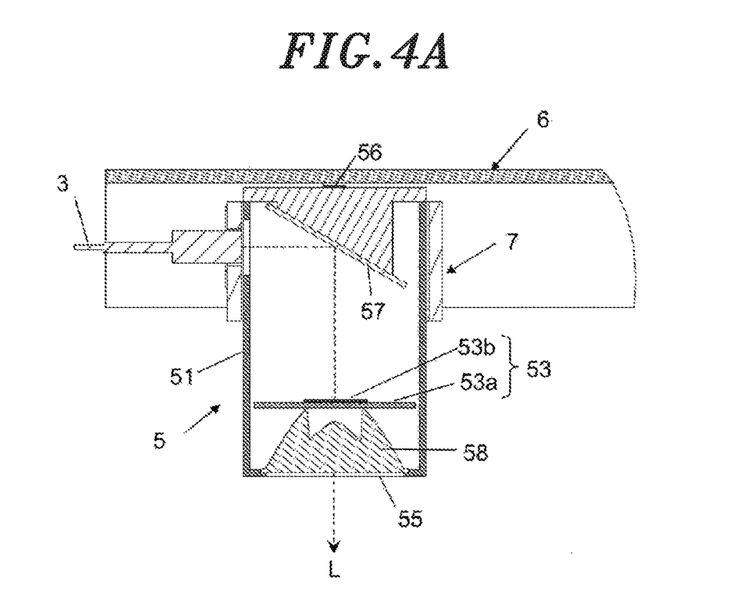
FIG. 4A is a cross sectional view taken along a longitudinal direction of a guide part, showing side cross-sections of a mounting fixture, a lighting appliance and a guide part used in the illumination device.
Figure 4B:
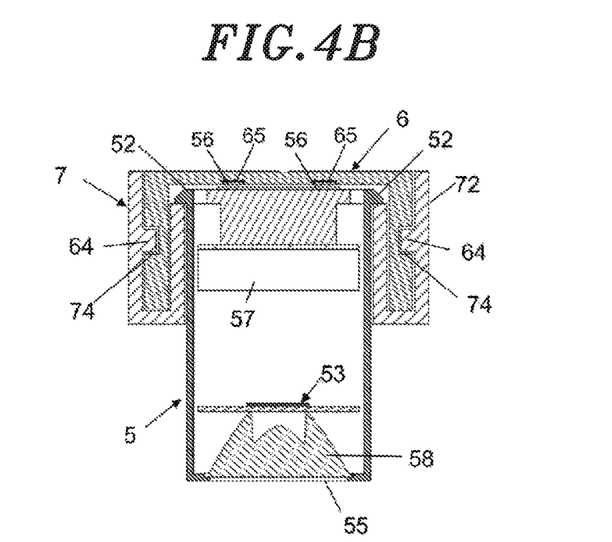
FIG. 4B is a sectional view taken along a direction orthogonal to the longitudinal direction of the guide part.

As illustrated in FIGS. 4A and 4B, the lighting appliance 5 includes a reflection portion 57 configured to reflect the laser light transmitted through the optical fiber 3 in a direction perpendicular to the mounting surface 6B of the guide part 6, and a wavelength conversion part 53 configured to convert a wavelength of the laser light reflected by the reflection portion 57 and to emit illumination light. Furthermore, the lighting appliance 5 includes an optical member 58 configured to control a distribution of the light emitted from the wavelength conversion part 53 and to generate a substantially parallel light.

The reflection portion 57 is fixed to the interior of the lighting appliance case 51 at an angle inclined with respect to the transmission direction of the laser light so as to reflect the laser light at an angle of 90 degrees. The wavelength conversion part 53 is formed of a phosphor plate which includes a phosphor configured to convert the wavelength of the laser light emitted from the light source 2 and to emit a wavelength-converted laser light.

The wavelength conversion part 53 includes a substrate 53a and a phosphor 53b formed on the substrate 53a in a film shape. For example, a crystalline substrate made of glass, quartz, sapphire or the like or a sintered body substrate made of spinel or the like may be used as the substrate 53a. Since materials such as quartz, sapphire or the like have high heat conductivity and are superior in heat dissipation, it is particularly preferable to use materials such as quartz, sapphire or the like. For example, as the phosphor 53b, a yellow phosphor excited by blue laser light to emit yellow light may be used. The wavelength conversion part 53 is configured to emit white illumination light obtained by mixing the blue laser light transmitted from the light source 2 through the optical fiber 3 and the yellow light generated by the light emission of the phosphor.

Figure 5:
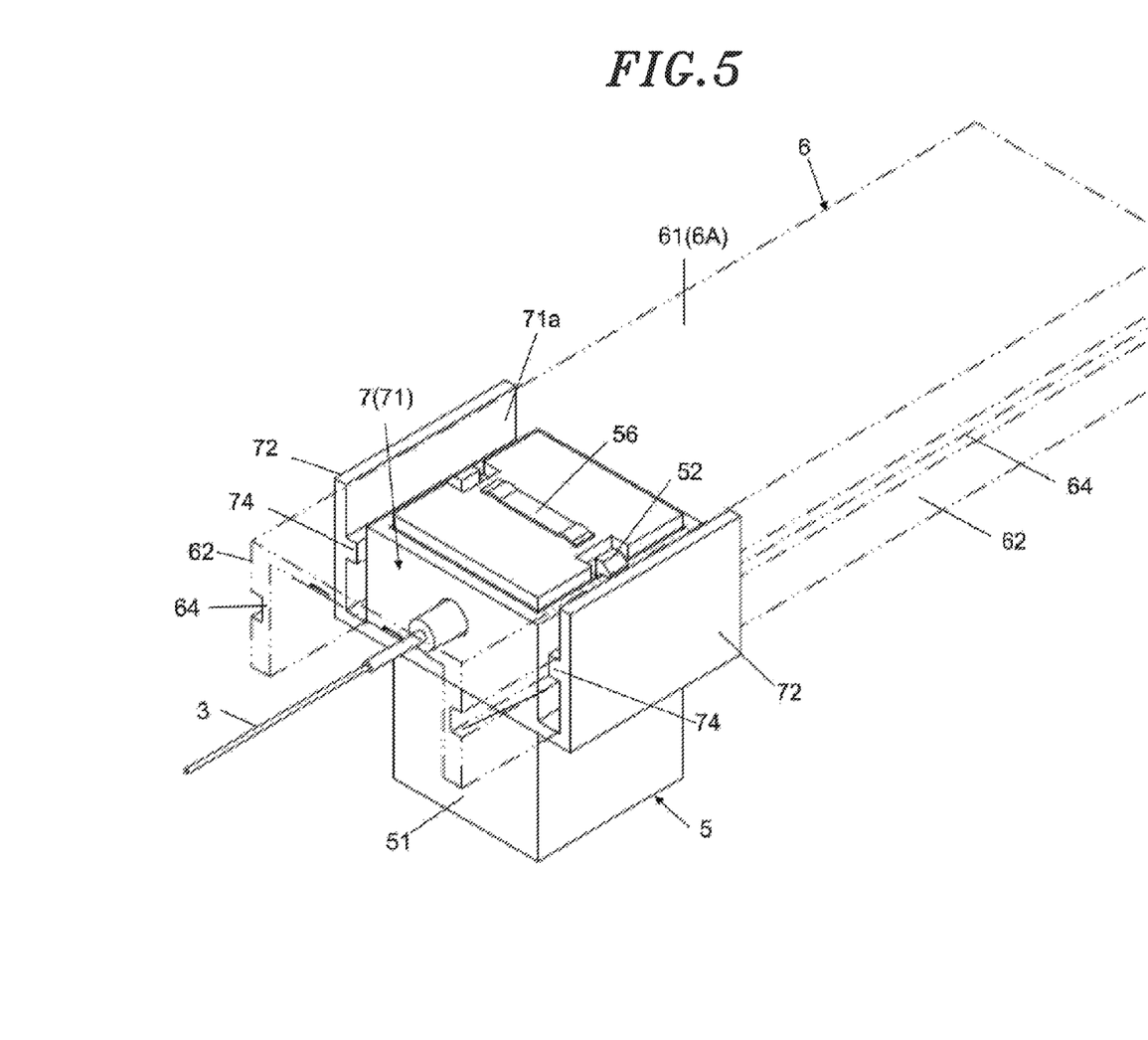
FIG. 5 is a perspective view of the mounting fixture, the lighting appliance and the guide part used in the illumination device.

As illustrated in FIG. 5, the guide part 6 of the illumination device 1 is fixed to the installation surface C (see FIG. 1) in advance. The mounting fixture 7 is inserted from one end portion of the guide part 6 so that the projection portions 74 of the mounting fixture 7 are engaged in the engagement grooves 64 of the guide part 6. Moreover, the connection base portions of the L-shaped engagement pieces 72 and the frame 71 may be formed so as to have predetermined elasticity. The mounting fixture 7 may be mounted to the guide part 6 by spreading the upper end portions of the engaging pieces 72 and interposing the opposite lateral walls 62 of the guide part 6 between the engaging pieces 72.

Since the projection portions 74 are engaged in the engagement grooves 64, the mounting fixture 7 is slidable along the guide part 6. In this state, the optical fiber 3 is connected to the light appliance 5 through the connection hole 73 of the mounting fixture 7. Subsequently, when the mounting fixture 7 is installed in an arbitrary position of the guide part 6, the lighting appliance 5 is fitted to the lower opening of the frame 71 of the mounting fixture 7. The engaging claws 52 engage with the frame 71 of the mounting fixture 7. Also, the leaf spring 56 on the top surface of the lighting appliance 5 come into contact with the electrodes 65 provided in the guide part 6, thereby short-circuiting the electrodes 65.

The lighting control circuit 23 of the light source 2 drives the semiconductor laser element 21 using the short-circuiting of the electrodes 56 as a trigger signal. The blue laser light emitted from the semiconductor laser element 21 is transmitted to the lighting appliance 5 through the optical fiber 3. The blue laser light is reflected by the reflection portion 57 and is incident on the wavelength conversion part 53. Then, the wavelength conversion part 53 converts the blue laser light to a white illumination light L. A distribution of the illumination light L (indicated by a downwardly-directed arrow in FIG. 4A) is controlled by the optical member 58 and the illumination light L is emitted to the outside of the lighting appliance 5.

According to the illumination device 1 configured as above, the lighting appliance 5 can be mounted in an arbitrary position of the guide part 6 having a rail-shape and extending in the transmission direction of the laser light. This enables a user or other person to arbitrarily select the installation position of the lighting appliance 5 which emits illumination light.

Furthermore, since the optical fiber 3 is formed in a curl cord shape, the mounting fixture 7 is slidable along the guide part 6 in a state in which the optical fiber 3 is capable of transmitting the laser light from the light source 2 to the lighting appliance 5. Thus, not only in a state in which the mounting fixture 7 is first mounted in an arbitrary position of the guide part 6 and then the lighting appliance 5 is mounted to the mounting fixture 7, but also in a state in which the lighting appliance 5 is mounted to the mounting fixture 7 and the illumination light is emitted from the lighting appliance 5, it is possible to freely slide the lighting appliance 5 and the mounting fixture 7. Accordingly, depending on an object to be illuminated which is located around an installation place of the illumination device 1, a user or other person can arbitrarily select the installation position of the lighting appliance 5 which emits the illumination light, while turning on the lighting appliance 5.

In the lighting appliance 5, the laser light transmitted through the optical fiber 3 can be reflected by the reflection portion 57 in the direction perpendicular to the mounting surface 6B of the guide part 6. The illumination light can be irradiated in that direction through the wavelength conversion part 53. Thus, the illumination device 1 can be suitably used as a spotlight. Moreover, the light source 2 emits laser light when the electrodes 65 of the guide part 6 are short-circuited, namely when the lighting appliance 5 is mounted to the guide part 6. It is therefore possible to prevent laser light from being unnecessarily emitted.

Figure 6A:
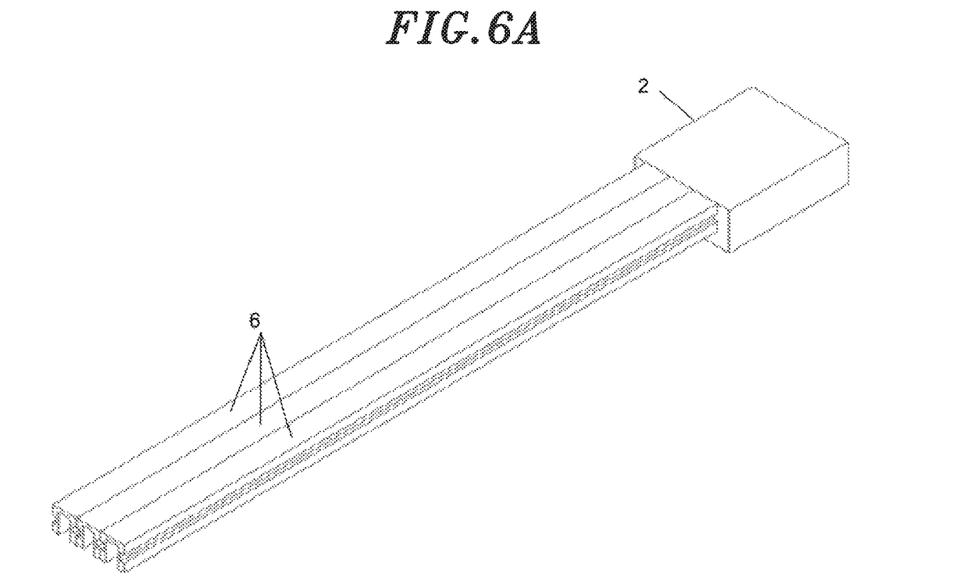
FIG. 6A is a perspective view of an illumination device according to a modification of the aforementioned embodiment.
Figure 6B:
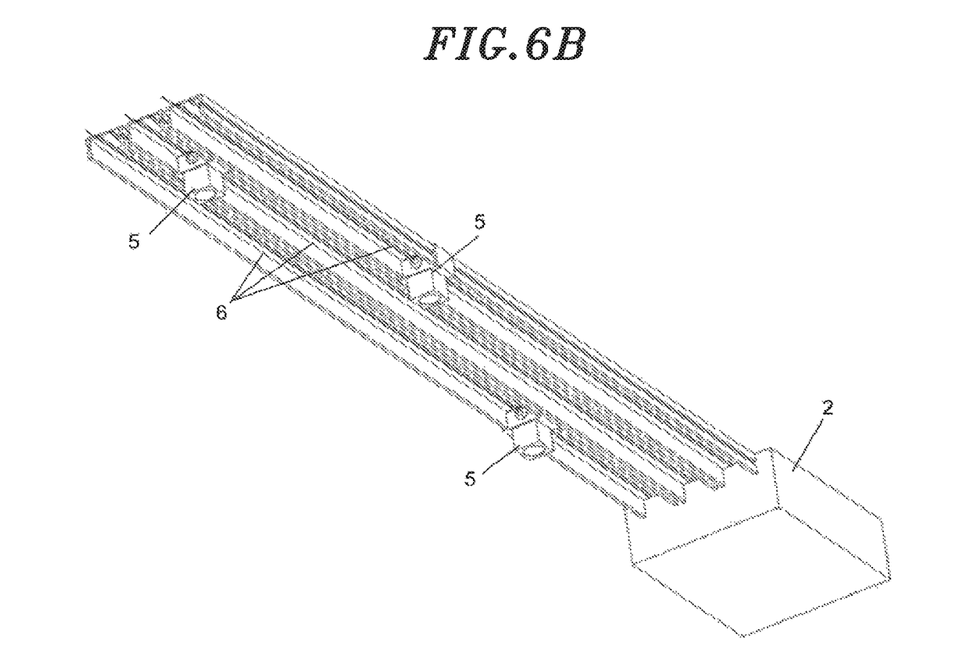
FIG. 6B is a perspective view thereof observed at an angle differing from the angle of FIG. 6A.

Next, an illumination device 1 according to a modification of the aforementioned embodiment will be described with reference to FIGS. 6A and 6B. The illumination device 1 according to this modified embodiment includes guide parts 6, mounting fixtures 7 and lighting appliances 5. The guide parts 6 are disposed in parallel and the lighting appliances 5 are mounted to the respective guide parts 6 through the respective mounting fixtures 7. Semiconductor laser elements 21 (not shown) are provided in the light source 2. Laser light is transmitted from each of the semiconductor laser elements 21 to each of the lighting appliances 5 through each of the optical fibers 3.

According to the illumination device 1 of the aforementioned embodiment, it is possible to arbitrarily select the location relationship of the lighting appliance 5 with respect to the light source 2. If the length of the guide parts 6 and the optical fiber 3 is sufficient, it is possible to increase the distance between the light source 2 and the lighting appliance 5. Thus, the light source 2 including the heat dissipation part 22 having a specified size can be installed in an inconspicuous position in the installation environment of the illumination device 1, and by extending the guide part 6 from the light source 2, the lighting appliance 5, which is small and inconspicuous, can be installed near (for example, just above) the object to be illuminated. In the illumination device 1 of the aforementioned embodiment, the light source 2 and the lighting appliance 5 are in a one-to-one correspondence relationship. Therefore, for example, if the installation environment of the illumination device 1 is wide, there may be a case in which only one lighting apparatus 5 is available and it is impossible to illuminate a plurality of objects or a wide range. In contrast, according to the modified embodiment, the use of a plurality of lighting appliances 5 makes it possible to illuminate a plurality of objects or a wide range. By mounting the plurality of lighting appliances 5 to the respective guide parts 6, it is possible to arbitrarily select the installation positions of the respective lighting appliances 5.

The present disclosure is not limited to the aforementioned embodiments but may be modified in many different forms. For example, in the aforementioned embodiments, there is illustrated a configuration in which the guide part 6 extends in a linear shape. However, the guide part 6 may be curved as long as the guide part 6 can appropriately hold the lighting appliance 5. Furthermore, the guide part 6 may be made of a flexible material so that the guide part 6 can be deformed into an appropriate shape depending on the installation environment of the illumination device 1. In addition, the lighting appliance 5 may be directly mounted to the guide part 6 without using the mounting fixture 7.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination device, comprising:
   a light source configured to emit a laser light;
   a transmission part configured to transmit the laser light emitted from the light source through an optical fiber; and a lighting appliance configured to convert a wavelength of the laser light transmitted through the transmission part and to emit an illumination light, wherein the transmission part includes a guide part having a rail-shape and extending along a transmission direction of the laser light, and the lighting appliance is configured to be mounted in an arbitrary position of the guide part.

2. The device of claim 1, further comprising:

a mounting fixture configured to mount the lighting appliance to the guide part, wherein the optical fiber is formed in a curl code shape and is connected at one end to the light source and at the other end to the lighting appliance via the mounting fixture, and the mounting fixture is slidable along the guide part in a state in which the optical fiber is capable of transmitting the laser light from the light source to the lighting appliance.

3. The device of claim 1, wherein the guide part includes a mounting surface to which the lighting appliance is mounted, the mounting surface extending along a longitudinal direction of the guide part, and the lighting appliance includes a reflection portion configured to reflect the laser light transmitted through the optical fiber in a direction perpendicular to the mounting surface.

4. The device of claim 2, wherein the guide part includes a mounting surface to which the lighting appliance is mounted, the mounting surface extending along a longitudinal direction of the guide part, and the lighting appliance includes a reflection portion configured to reflect the laser light transmitted through the optical fiber in a direction perpendicular to the mounting surface.

5. The device of claim 1, wherein the guide part includes a pair of electrodes extending along a longitudinal direction thereof, the lighting appliance includes a conductive member configured to short-circuit the pair of the electrodes when the lighting appliance is mounted to the guide part, and the light source is configured to emit the laser light when the pair of the electrodes are short-circuited.

6. The device of claim 2, wherein the guide part includes a pair of electrodes extending along a longitudinal direction thereof, the lighting appliance includes a conductive member configured to short-circuit the pair of the electrodes when the lighting appliance is mounted to the guide part, and the light source is configured to emit the laser light when the pair of the electrodes are short-circuited.

7. The device of claim 3, wherein the guide part includes a pair of electrodes extending along a longitudinal direction thereof, the lighting appliance includes a conductive member configured to short-circuit the pair of the electrodes when the lighting appliance is mounted to the guide part, and the light source is configured to emit the laser light when the pair of the electrodes are short-circuited.

8. The device of claim 2, wherein the guide part includes a plurality of guide parts, the mounting fixture includes a plurality of mounting fixtures and the lighting appliance includes a plurality of lighting appliances, and wherein the plurality of the lighting appliances are configured to be mounted to the plurality of the guide parts through the plurality of the mounting fixtures, respectively.

9. The device of claim 4, wherein the guide part includes a plurality of guide parts, the mounting fixture includes a plurality of mounting fixtures and the lighting appliance includes a plurality of lighting appliances, and wherein the plurality of the lighting appliances are configured to be mounted to the plurality of the guide parts through the plurality of the mounting fixtures, respectively.

10. The device of claim 6, wherein the guide part includes a plurality of guide parts, the mounting fixture includes a plurality of mounting fixtures and the lighting appliance includes a plurality of lighting appliances, and wherein the plurality of the lighting appliances are configured to be mounted to the plurality of the guide parts through the plurality of the mounting fixtures, respectively.

11. The device of claim 5, wherein the pair of the electrodes extend over the total length of the guide part.

12. The device of claim 6, wherein the pair of the electrodes extend over the total length of the guide part.

13. The device of claim 7, wherein the pair of the electrodes extend over the total length of the guide part.

* * * * *